I. I. WIGGINS.
DIFFERENTIAL MECHANISM FOR FRONT AND REAR DRIVEN VEHICLES.
APPLICATION FILED APR. 12, 1917.
1,350,194.
Patented Aug. 17, 1920.
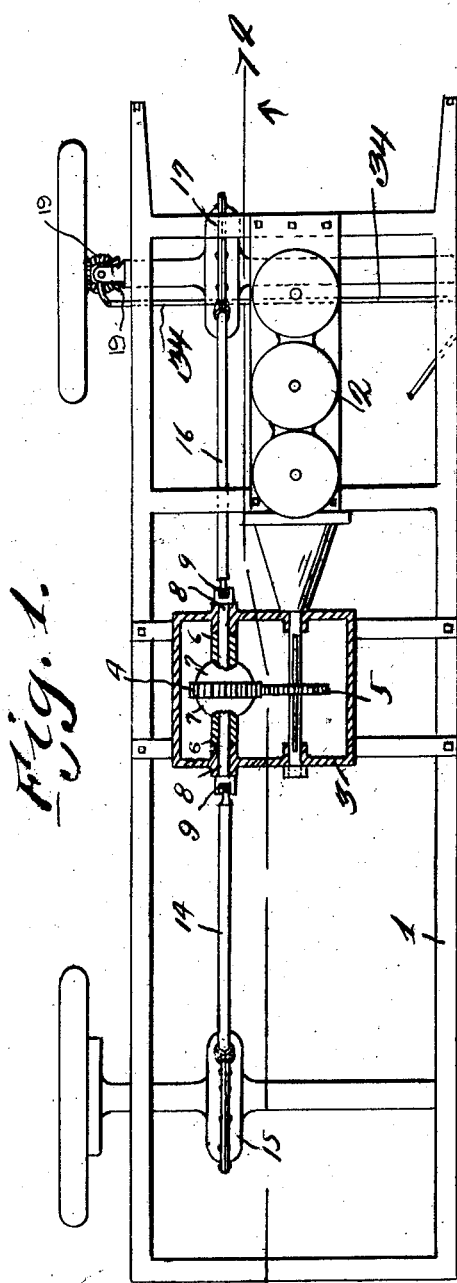
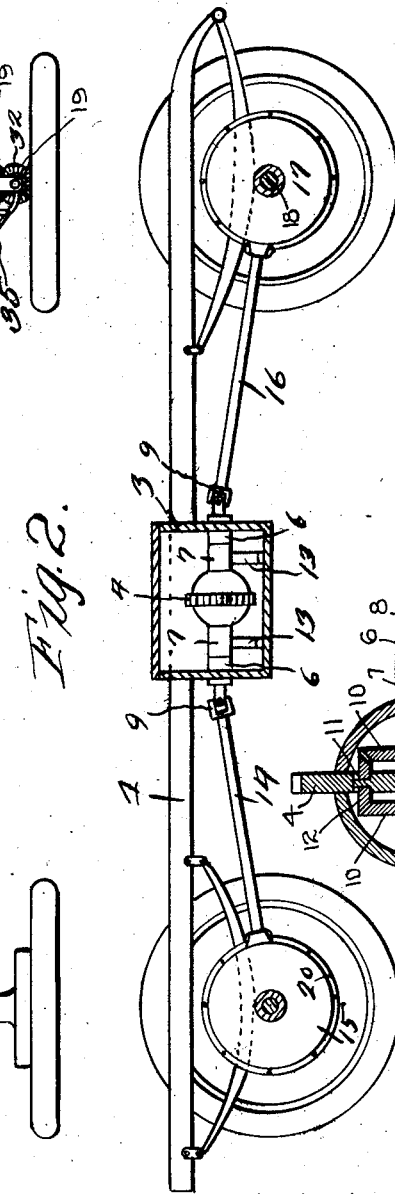
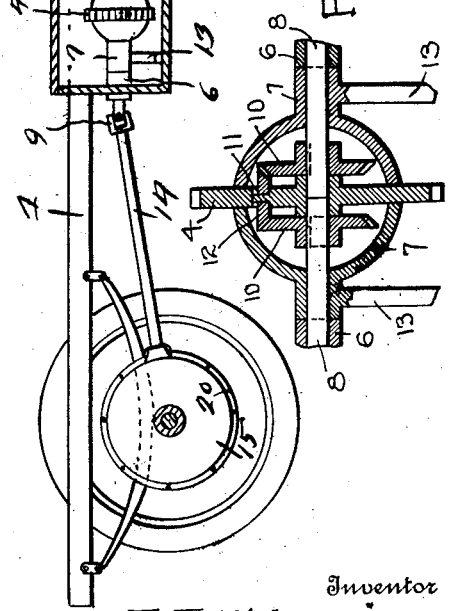
Witnesses
Inventor
I. I. Wiggins
By D. Swift & Co.
Attorneys

UNITED STATES PATENT OFFICE.

ISAM ISAAC WIGGINS, OF McINTOSH, GEORGIA.

DIFFERENTIAL MECHANISM FOR FRONT AND REAR DRIVEN VEHICLES.

1,350,194.   Specification of Letters Patent.   Patented Aug. 17, 1920.

Application filed April 12, 1917. Serial No. 161,504.

*To all whom it may concern:*

Be it known that I, ISAM ISAAC WIGGINS, a citizen of the United States, residing at McIntosh, in the county of Liberty, State of Georgia, have invented a new and useful Differential Mechanism for Front and Rear Driven Vehicles; and I do hereby declare the following to be a full, clear, and exact description of the invention, such as will enable others skilled in the art to which it appertains to make and use the same.

This invention is an improved automobile driving differential mechanism, particularly adapted for use on motor trucks, and has for its principal object to provide a differential mechanism particularly adapted for use on front and rear driven motor vehicles.

The invention consists briefly of a centrally disposed differential gearing which in turn communicates with and operates differentials on both forward and rear axles, means being provided to permit the front wheels to be steered while receiving power from the engine.

In the drawings:

Figure 1 is the plan view of a motor truck, showing the manner in which the invention is applied.

Fig. 2 is a section on line 2—2 of Fig. 1.

Fig. 3 is a longitudinal section through the differential gearing to which the engine shaft is geared.

Referring to the drawings 1 designates a truck frame on which the engine 2 is mounted, a casing 3 centrally disposed on the frame containing a differential gear 4 and a gear 5 carried by the engine shaft. The gears 4 and 5 mesh, thus the rotation of the engine shaft is transferred to the differential gear 4.

The casing 3 is provided with the bearings 6 which are integrally formed in the end walls thereof. The bearings 6 adjoin the hemispherical members 7 which house the several gears constituting the differential, the gear 4 rotating between these hemispherical members. The short shafts 8 are journaled in the bearings 6 and where they project outside of the bearings universal joints 9 are connected. Within the hemispherical members 7, the shafts 8 abut each other and a beveled gear 10 is keyed to each close to their abutting ends. The gear 4 is supported between the gears 10 on the ends of the two shafts 8 around which it is capable of rotation. On a radial stud 11, the gear 4 carries the beveled gear 12 which meshes with both of the gears 10. The hemispherical members 7 are supported by the legs 13 which are attached to the bottom of the casing 3.

The shaft 14 connects with the universal joint 9 at the rear of the casing 3 and is journaled in the differential gear case 15, connecting with the differential gearing therein in the same manner that the shaft 16 connects with the differential gearing in the casing 17. The shaft 16 is journaled in the casing 17 and drives a differential therein, which differential drives the conventional form of driven front axle through shafting 18 and bevel gears 19.

The rotation of the engine imparts motion to the centrally disposed differential gear and this in turn transmits it to the front and rear differentials, thus imparting power to all four wheels, the front wheels receiving their power through the beveled gears 19 trains.

What is claimed is:—

A differential mechanism comprising a pair of axially alined and abutting driving shafts, a bevel gear keyed to each of the abutting ends of the driving shafts, a spur gear intermediate the two bevel gears and mounted loosely on the axial abutting ends of the two parts of the driving shafts, said spur gear having a radial pin, a bevel pinion journaled on said pin at right angles to the axis of said spur gear and meshing with the bevel gears, a casing surrounding the bevel gears and the central portion of the spur gear and having its outer edges spaced from the teeth of said spur gear, said casing comprising two semi-spherical sections, the outer ends of said semi-spherical sections forming supporting means for the axially alined driving shafts, and means for supporting the sections of the casing and its bearings.

In testimony whereof I have signed my name to this specification in the presence of two subscribing witnesses.

ISAM ISAAC WIGGINS.

Witnesses:
J. B. BREWTON,
C. W. ASHMORE.